Feb. 24, 1970     M. H. FINLAY     3,496,918
VARIABLE VALVE TIMING CONTROL FOR INTERNAL COMBUSTION ENGINES
Filed April 23, 1968     2 Sheets-Sheet 1

INVENTOR.
MADISON H. FINLAY
BY
MAHONEY & HORNBAKER
ATTORNEYS

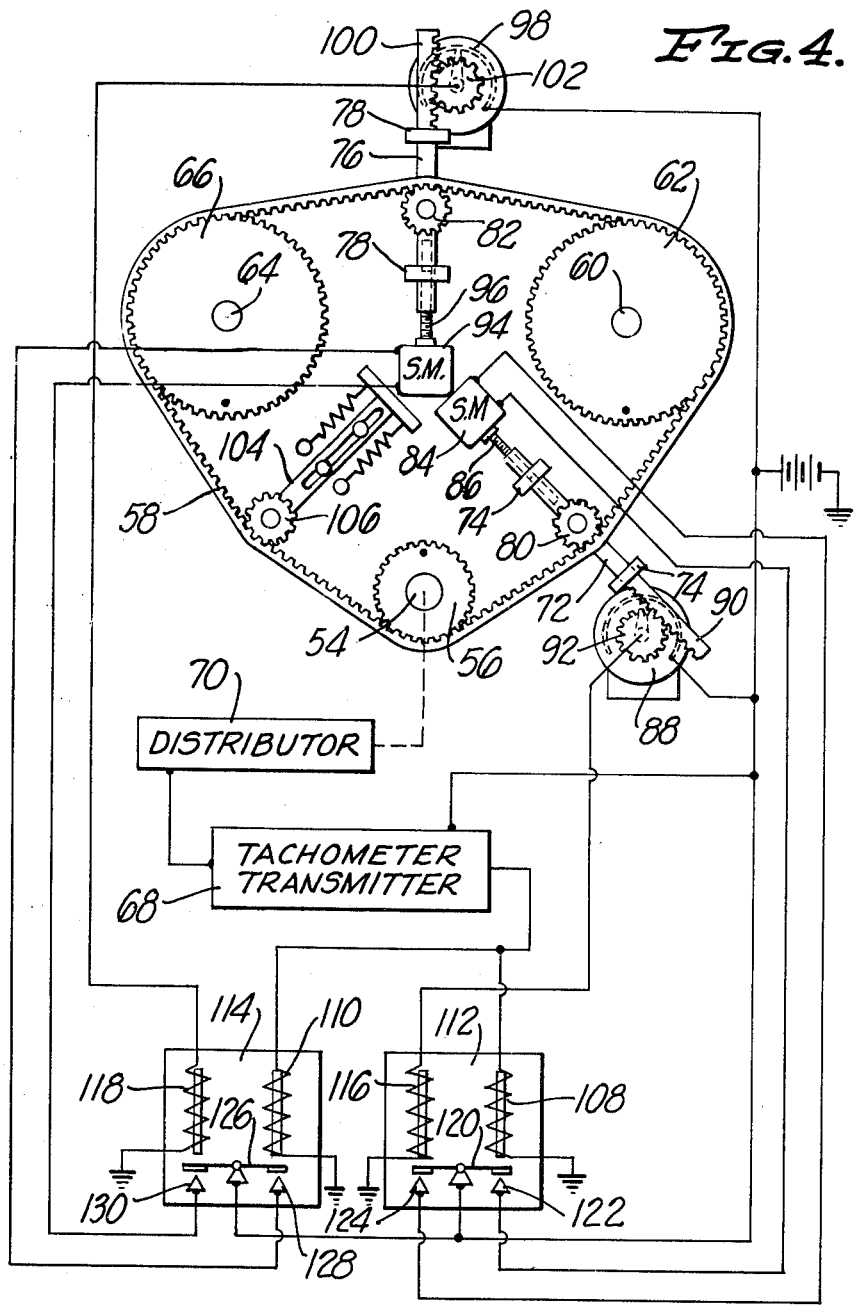

United States Patent Office 3,496,918
Patented Feb. 24, 1970

3,496,918
VARIABLE VALVE TIMING CONTROL FOR
INTERNAL COMBUSTION ENGINES
Madison H. Finlay, 12012 Valleyheart Drive,
Studio City, Calif. 91604
Filed Apr. 23, 1968, Ser. No. 723,466
Int. Cl. F02d 13/02
U.S. Cl. 123—90                                    25 Claims

ABSTRACT OF THE DISCLOSURE

Engine speed and valve timing are each constantly monitored and separate electrical signals produced corresponding at preplanned rates exactly according to variations in each. The signals are produced to balance according to a preplanned schedule, a particular timing signal and setting for each particular increment of engine speed. The signals are constantly electrically compared and when out-of-balance due to engine speed change, the valve timing is electrically changed to rebalance the signals and correct the timing according to the preplanned schedule. Where desirable, inlet and exhaust valve timing may be separately controlled according to separate schedules in the same manner.

BACKGROUND OF THE INVENTION

This invention relates to variable valve timing for internal combustion engines and more particularly, to constructions and methods readily adaptable to standard internal combustion engines for providing automatically electrically controlled, preplanned valve timing according to a preset schedule for each increment of variable engine speed, that is, as the engine speed increases or decreases during operation thereof, the valve timing is automatically electrically changed according to a preset schedule of valve timing relative to piston movement. In this manner, the most efficient valve timing may be provided for each increment of engine speed to, in turn, provide maximum combustion efficiency. In the case of twin valve timing control, each of the sets of inlet and exhaust valves of the internal combustion engine may be similarly separately controlled according to separate preset schedules for even further increasing the combustion efficiency thereof.

Most modern internal combustion engines are provided with ignition timing control wherein the ignition timing is automatically advanced or retarded according to engine speed and to provide the most efficient ignition timing for that particular engine speed. Prior to the present invention, however, whether without or in combination with said prior ignition timing control, there has never been, to my knowledge, an internal combustion engine with true variable valve timing control arranged to provide the most efficient valve timing for each increment of engine speed. There have been certain attempts to provide such variable valve timing, all of which have included certain serious deficiencies resulting in a lack of true variable valve timing control, particularly on a preplanned basis or schedule dictated directly by the particular engine design.

For instance, one prior crude attempt at providing variable valve timing control has depended solely on hand adjustment. A visually observed tachometer is connected to the engine for determining the speed and changes in speed thereof, and hand operated controls are arranged with the drive to the inlet and exhaust valves for varying said drive to vary the timing of the valves relative to the piston movements. Thus, as the engine speed is observed to change, the valve timing is hand adjusted in an attempt to perform the same with the most efficient setting for the changed speed.

Such an arrangement of variable valve timing might be satisfactory for certain forms of stationary engine installation where the engine is adjusted to operate at merely several preset speeds. In such case, the necessary delays occasioned by hand control of the variation of the valve timing could be tolerated and would not be of great consequence. In the case of an internal combustion engine installation where speeds are rapidly changing over a relatively wide range and only remain at single speed levels for short periods of time, such as the engine of a modern automobile, hand timing control and adjustment would be completely intolerable and of virtually no value for the many obvious reasons involved.

Another prior attempt to provide variable valve timing for internal combustion engines has been by use of monitoring engine oil pressure and varying the valve timing according to variations in said oil pressure. Clearly, there are many variations in oil pressure of an internal combustion engine which do not directly relate to a change in engine speed of said engine. For instance, changes in temperature will change oil viscosity so as to increase or decrease the engine oil pressure despite a lack of change of engine speed, and furthermore, engine oil pressure, even assuming a constant temperature, will not change exactly according to engine speed making such variable valve timing depending on oil pressure completely inaccurate and unusable.

OBJECTS AND SUMMARY OF THE INVENTION

It is, therefore, an object of this invention to provide variable valve timing control for internal combustion engines in which there is preplanned valve timing according to a preset schedule or schedules for each increment of engine speed, the valve timing being automatically electrically controlled and changed exactly according to changes in engine speed. As the engine speed increases or decreases, such increase or decrease is immediately electrically detected and the valve timing is instantaneously changed to conform to the new engine speed, any lag for such change being virtually infinitesimal. In this manner, proper valve timing in a varying preplanned pattern is obtained for the various increments of engine speed so that the maximum of efficiency of combustion may be maintained at all times despite widely varying and quickly changing engine speed.

More particularly according to the present invention, both the engine speed and valve timing are constantly monitored and separate electrical signals are produced for each varying at preplanned rates exactly according to variations in said engine speed and valve timing. Furthermore, the electrical signals thusly produced are preplanned to balance in at least a preplanned determinable manner when the valve timing is at a desired setting for each increment of engine speed. Thus, the electrical signals for engine speed and valve timing are preferably constantly electrically compared and as soon as an out-of-balance condition therebetween is determined, the valve timing is readjusted, preferably automatically electrically, to bring the valve timing into conformity with the particular engine speed according to the preplanned schedule, thereby providing the maximum efficiency of combustion for each increment of engine speed.

It is a further object of this invention to provide variable valve timing control for internal combustion engines satisfying the foregoing general characteristics and which permits a separate programmed valve timing schedule for each individual engine or for each set design of engine. Obviously, with the form of valve timing control involved, it is possible to program the particular valve timing control different for each engine and dependent on that particular engine's operating characteristics. The most desirable valve timing for a particular engine operating at a particular speed increment is relatively easily calculable by automotive engineers skilled in the art so that the schedule of valve timing to provide the most efficient combustion can relatively easily be determined for each engine design. Thereafter, it is merely necessary to program such valve timing variable control schedule into that particular engine.

It is also an object of this invention to provide a variable valve timing control for internal combustion engines having the foregoing general characteristics and which permits the independent variable timing control of inlet and exhaust valve where the engine is of a twin valve timing control type. For instance, where the engine is of the type having separate rotatable camshafts for separately controlling the opening and closing of sets of inlet and exhaust valves, each of said sets of valves may be separately programmed for separate variation in timing in the same manner hereinbefore discussed. It is only necessary to provide the monitoring of the timing of the two sets of valves for producing separate signals, comparing each of these signals with the engine speed signal and automatically varying the timing of the particular set of valves in the programmed or preplanned manner independent of the timing of the other set of valves.

It is an additional object of this invention to provide variable valve timing control for internal combustion engines having the foregoing general characteristics and which reduces undesirable products of combustion, as well as increases the power of the engine, through more efficient combustion. The present invention, therefore, makes possible, with present internal combustion engines and in combination with the present automotive anti-smog devices, virtually a complete elimination of the emissions of smog contributing waste from such internal combustion engines. The present invention thereby provides a solution to a major, present day problem which is particularly critical in populous areas.

BRIEF DESCRIPTION OF THE DRAWINGS

FIG. 4 is a view similar to FIG. 1 but with a form of the variable valve timing control of the present invention adapted to a twin valve timing control internal combustion engine.

DESCRIPTION OF THE BEST EMBODIMENTS CONTEMPLATED

Figure 1:
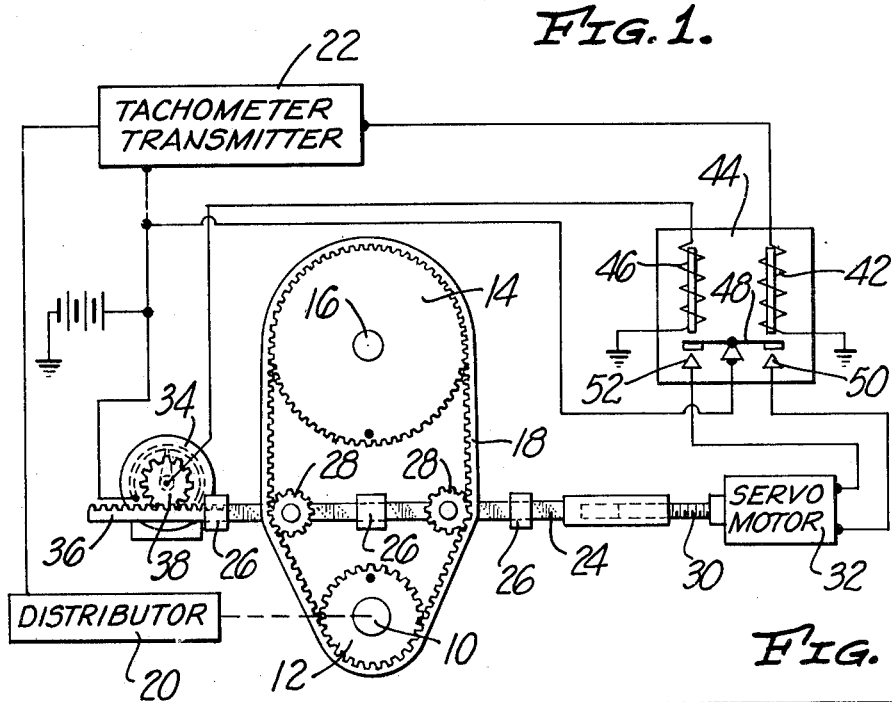
FIG. 1 is a somewhat diagrammatic view illustrating an embodiment of the variable valve timing control of the present invention in combination with a single valve timing control internal combustion engine.

Referring to the drawings and particularly FIG. 1 thereof, a portion of a single valve timing control internal combustion engine is somewhat diagrammatically illustrated incorporating an embodiment of the unique variable valve timing control of the present invention. In general description, the internal combustion engine is of the usual type, well known to those skilled in the art, having a series of pistons reciprocally driven in cylinders and in turn operably connected for rotatably driving a crankshaft. The fuel mixture is directed and controlled to the cylinders through usual inlet valves, the fuel mixture exploded by a usual timed ignition system including a distributor and whether variable timed or otherwise, and the waste products of combustion are directed from the cylinders through usual exhaust valves, all of said inlet and exhaust valves being controlled for opening and closing in timed relationship by the usual camshaft.

As specifically illustrated in FIG. 1, therefore, a drive shaft 10 is rotatably driven by the reciprocal movements of the pistons in the cylinders and has a usual camshaft driving gear 12 secured thereto. The camshaft driving gear 12 is connected for driving a camshaft driven gear 14 mounted on a single camshaft 16 through a cogged camshaft driving belt 18. Thus, the rotation of the camshaft 16 is precisely timed to the rotation of the drive shaft 10 and such timing is only capable of variation by varying the drive between the camshaft driving and driven gears 12 and 14 through the variation in the connection thereto of the camshaft driving belt 18.

The camshaft 16, of course, through the rotation thereof controls the opening and closing of the inlet and exhaust valves in a predictable timed relationship to the reciprocal movements of the pistons within the cylinders. A usual distributor 20 is operably connected in the usual manner for operation by the drive shaft 10 so that the distributor controls the ignition of the fuel mixture within the cylinders also on a predictable timed basis relative to the piston reciprocal movements and the opening and closing of the inlet and exhaust valves, said ignition controlled by the distributor 20 being either on a constant or controlled variable timed basis in the usual manner. As thus far described, the internal combustion engine is of the single valve timing control type, that is, the timing of opening and closing of the inlet and exhaust valves is controlled relative to the piston movements by the single camshaft 16.

Figure 2:
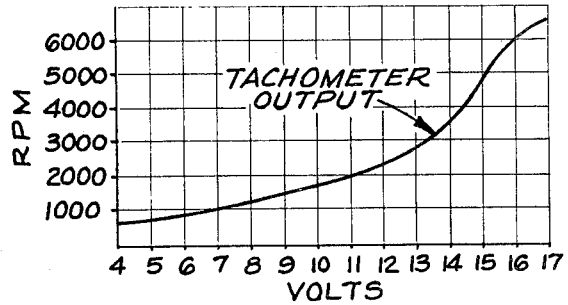
FIG. 2 is a graph showing a typical tachometer transmitter electrical signal output for varying engine speeds.

More particularly to the improvements of the present invention, a standard form of tachometer transmitter 22 is operably connected to the drive shaft 10, preferably through the distributor 20, for constantly monitoring or sensing the speed of rotation of the drive shaft 10 and producing an electrical signal varying in voltage at preplanned rates exactly according to variations in said drive shaft speed of rotation or engine speed. A graph illustrating the electrical signal voltage output of a typical tachometer transmitter according to engine speed is shown in FIG. 2 and it will be noted that, for instance, at an engine speed of 2,000 r.p.m. there is an electrical signal output from the tachometer transmitter of 11 volts progressing upwardly at the preplanned rates to 16 volts at 6,000 r.p.m. The electrical signals of the tachometer transmitter 22, therefore, vary at the predictable preplanned rates exactly according to variations in engine speed and it is obviously immaterial to the broad principles of the present invention the source of obtaining said electrical signals as long as the same vary on a predictable basis exactly according to variations in engine speed.

A valve timing regulating slide 24 is slidably connected to appropriate mounting brackets 26 adjacent the path of travel of the camshaft driving belt 18 and rotatably mounts a pair of spaced idler gears 28 operably engaged with the camshaft driving belt. The idler gears 28 are at spaced locations along the valve timing regulating slide 24 arranged for taking up slack in the camshaft driving belt 18 and maintaining said driving belt in tight engagement at all times with the camshaft driving and driven gears 12 and 14. At the same time, the positioning of the valve timing regulating slide 24 and the idler gears 28 thereon is such that slidable movement of the regulating slide will cause the idler gears to simultaneously lengthen the camshaft driving belt 18 at one common side of the camshaft driving and driven gears 12 and 14 while simultaneously shortening said driving valve at the opposite common sides of the driving and driven gears.

As a consequence, predictable slidable movements of the valve timing regulating slide 24 in either slidable direction will predictably and exactly change the timing of the drive between the drive shaft 10 and the camshaft 16. Clearly, one direction of slidable movement of the valve timing regulating slide 24 will advance the timed movement of the camshaft 16 relative to the piston movements, whereas the opposite slidable movements will progressively retard such timing, all of which can be exactly predicted dependent on the particular size and arrangement of working elements. In this manner, the timing of the valve operating means, comprised herein by the combination of the camshaft driving gear 12, the camshaft driving belt 18, the camshaft driven gear 14 and the camshaft 16, can be altered on a predictable and exactly determinable basis or schedule or rate by predicted movements of the timing regulating means, comprised herein in part by the valve timing regulating slide 24.

The valve timing regulating slide 24 is driven in its slidable movements through a screw drive 30 secured to one end thereof, said screw drive being in turn operably connected for rotation by a usual, reversible, electrically actuated servomotor 32. In the arrangement shown and described, electrical actuation of the servomotor 32 in one direction will, through the screw drive 30, slidably move the valve timing regulating slide 24 in one direction altering the drive to the camshaft 16 and the timing of the valves controlled thereby in an exact predictable manner. Electrical actuation of the servomotor 32 in the opposite direction will slidably move the valve timing regulating slide 24 in the opposite direction and create the opposite predictable timing change in the drive to the camshaft 16 and the valves actuated thereby.

A typical potentiometer 34 is mounted adjacent the opposite end of the valve timing regulating slide 24 from the screw drive 30 and servomotor 32, said potentiometer being connected for operation by slidable movements of the valve timing regulating slide through a rack 36 formed on the regulating slide operably engaged with a gear 38 mounted for regulating the potentiometer. The potentiometer 34 is constructed and electrically connected in the usual manner for producing an electrical signal varying exactly according to the variation in setting thereof, said potentiometer setting herein, in turn, being exactly regulated by the movements of the valve timing regulating slide 24 through the rack 36 and gear 38 as described. Thus, the electrical signal produced by the potentiometer 34 is exactly dependent on the setting of the timing of the inlet and exhaust valves relative to the piston reciprocal movements, and may be varied exactly with the valve timing in a predictable manner by the electrical actuation of the servomotor 32 in one direction or the other.

Figure 3:
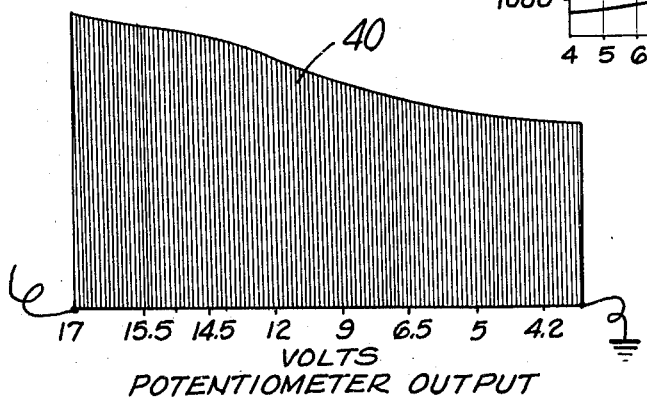
FIG. 3 is a plan developed view of a typical potentiometer coil showing an electrical signal output thereof relating in a preplanned manner to the tachometer transmitter output of FIG. 2.

A plan layout of the coil of the potentiometer 34 is illustrated in FIG. 3 wherein said coil is generally indicated at 40. It will be noted that the coil 40 is wound such that the potentiometer electrical signal output increases at predictable and preplanned rates along said coil, said electrical signal output varying from approximately 4 volts to 17 volts, the same range as the previously described electrical signal from the tachometer transmitter 22. In the particular construction of the embodiment of FIG. 1, therefore, the potentiometer 34 may be programmed so that the electrical signals therefrom will exactly balance or be equal to the electrical signals of the previously described tachometer transmitter 22 when the valve timing is at a particular setting for a particular speed of the internal combustion engine so that with proper exact programming of the potentiometer based on the particular characteristics of design of the internal combustion engine, an exact predicted valve timing providing the maximum efficiency of combustion may be provided for each increment of engine speed.

The electrical signals of the tachometer transmitter 22 are electrically connected to one coil 42 of a conventional balance relay 44 and the electrical signals of the potentiometer 34 are electrically connected to an opposite coil 46 of said balance relay. The coils 42 and 46 of the balance relay 44, in the usual manner, control the positioning of a balance contact arm 48, the position of said contact arm, in turn, controlling electrical circuits through opposite contacts 50 and 52. Finally, the electrical circuit from the balance contact arm 48 through the contact 50 is connected to the servomotor 32 for driving said servomotor in one direction of rotation, while the electrical circuit from the balance contact arm through the contact 52 is connected to said servomotor for driving the same in the opposite direction of rotation.

Thus, when the electrical signals from the tachometer transmitter 22 and the potentiometer 34 are balanced or, in this case, equal, the balance contact arm 48 remains balanced and free of contact with either of the contacts 50 and 52 so that the servomotor 32 remains stationary and the valve timing of the internal combustion engine remains constant, which would only be true when the speed of the engine remains constant. When the speed of the engine increases, thereby increasing the voltage of the signal from the tachometer transmitter 22, the balance relay coil 42 is energized stronger than the coil 46 causing the balance contact arm 48 to make the electrical circuit through the contact 52 electrically energizing the servomotor 32 and causing a readjustment of the engine valve timing until the signal of the potentiometer 34 increases sufficiently to again balance the balance contact arm. A decrease in the speed of the engine creates an opposite reaction, that is, a decrease in the signal of the tachometer transmitter 22 causing the coil 46 to overcome the coil 42 and an electrical circuit to be made through the balance contact arm 48 and the contact 50 electrically energizing the servomotor 32 in the opposite direction of rotation readjusting the valve timing in the opposite direction until the signal of the potentiometer 34 again balances with the signal of the tachometer transmitter.

The overall result is that the potentiometer coil 40 of the potentiometer 34 may be programmed to produce electrical signals corresponding to signals of the tachometer transmitter 22 on an exact preplanned schedule according to individual increments of engine speed dependent on the design of the particular engine and for providing the most efficient valve timing relative to piston reciprocation at each engine speed increment. Furthermore, by monitoring or sensing engine speed versus valve timing with the apparatus and in the manner hereinbefore described, as soon as the engine speed changes, the valve timing is changed to the new preplanned valve timing setting corresponding to that particular engine speed. Also, the monitoring or sensing of the engine speed and valve timing through the production of the appropriate electrical signals and the immediate rebalancing of said electrical signals through electrical change of the valve timing upon engine speed variations produces only an infinitesimal lag between engine speed change and valve timing readjustment accomplishing an engine combustion efficiency far greater than has heretofore been possible prior to the present invention.

A somewhat diagrammatic illustration of a twin valve timing control internal combustion engine is shown in FIG. 4 incorporating the principles of the present invention. In the internal combustion engine of FIG. 4, the inlet valves of the cylinders are operated by a separate camshaft from the exhaust valves of said cylinders, and to this extent, the internal combustion engine is a standard twin cam engine. As a result, the inlet valves of the engine may be controlled in programmed variable timing relative to the piston reciprocations or movement separate from the controlled variable timing of the exhaust valves relative to said piston movements providing even greater individual cylinder combustion efficiency than is possible with the previously described single cam engine.

As shown in FIG. 4, a drive shaft 54 rotatably driven by the reciprocating pistons has a camshaft driving gear 56 secured for rotation therewith and operably connected through a camshaft driving belt 58 for rotating an inlet valve camshaft 60 through a camshaft driving gear 62 and an exhaust valve camshaft 64 through a camshaft driving gear 66. Thus, the drive shaft 54 operates the inlet and exhaust camshafts separately and provides separate opening and closing of the set of inlet valves from the set of exhaust valves in exact timed relationships to the piston reciprocal movements within the cylinders.

As in the first embodiment, a tachometer transmitter 68 is operably connected to the drive shaft 54, preferably through distributor 70 for exactly monitoring or sensing the speed of the drive shaft and, therefore, the speed of the engine and producing an electrical signal varying at preplanned rates exactly according to said engine speed. Only a single tachometer transmitter 68 is required, despite the twin cam control, in view of the fact that the timing of the inlet and exhaust valves is to be regulated and controlled by the same engine speed.

A first regulating slide 72 is slidably mounted adjacent to the path of travel of the camshaft driving belt 58 between the drive shaft 54 and the inlet valve camshaft 60 by means of mounting brackets 74 and a second regulating slide 76 is similarly mounted by mounting brackets 78 between the inlet and exhaust valve camshafts 60 and 64. The first regulating slide 72 mounts an idler gear 80 engaged with the camshaft driving belt 58 and thereby exactly regulating the timed drive between the drive shaft 54 and the inlet valve camshaft 60, with the second regulating slide 76 having a similar idler gear 82 exactly controlling the timing drive from the drive shaft 54 to the exhaust valve camshaft 64, but through the intermediate inlet valve camshaft 60. In other words, in the particular arrangement shown, adjusted movements of the first regulating slide 72 will affect the timing of both the inlet and exhaust valve camshafts, said effect being easily capable of precalculation and predetermination, so that exact variable regulation of the second regulating slide 76 for obtaining a predetermined variation in timing of the exhaust valve camshaft 64 must necessarily take into account the simultaneous variable adjustments of the first regulating slide.

The slidable movements of the first regulating slide 72 are provided by a standard, electrically actuated, variable speed servometer 84 through a usual screw drive 86 with the first regulating slide being, in turn, operably connected to an inlet valve potentiometer 88 through a rack 90 and gear 92. The second regulating slide 76 is similarly slidably moved by a servomotor 94 through a screw drive 96 and is operably connected to an exhaust valve potentiometer 98 through a rack 100 and gear 102. The movements of the first and second regulating slides 72 and 76 changing the timing control to the inlet and exhaust valve camshafts 60 and 64 by the slidable regulations of the camshaft driving belt 58 are automatically followed by a spring urged tensioning slide 104 having an idler gear 106 engaged with said camshaft driving belt maintaining said belt properly tensioned at all times around the other described elements.

Thus, the coil of the inlet valve potentiometer 88 and the coil of the exhaust valve potentiometer 98 may be programmed for monitoring or sensing the timing of the inlet and exhaust valves relative to the piston recipricotions, each of said potentiometers producing an electrical signal varying at preplanned rates exactly according to said inlet and exhaust valve timing. Furthermore, by proper precalculation for such programming of the inlet and exhaust valve potentiometers 88 and 98, the respective electrical signals from said potentiometers will balance with the electrical signal from the tachometer transmitter when the inlet valve and exhaust valve timing settings are at exact preplanned timed settings for each increment of engine speed as monitored or sensed by the tachometer transmitter 68. Again it is pointed out that in the particular arrangement shown, the coil of the exhaust valve potentiometer 98 must be programmed to take into account simultaneous varying adjustments of the first regulating slide 72 in order to obtain the preplanned timing adjustments of the exhaust valves in view of the fact that the movements and adjustments of the first regulating slide will directly affect the timing of said exhaust valves but being easily capable of precalculation by one skilled in the art.

The electrical signal of the tachometer transmitter 68 is electrically connected to first coils 108 and 110 of inlet and exhaust valve balancing relays 112 and 114, an opposite coil 116 of the inlet valve balancing relay 112 being electrically connected to the electrical signal from the inlet valve potentiometer 88 and an opposite coil 118 of the exhaust valve balancing relay 114 being electrically connected to the electrical signal from the exhaust valve potentiometer 98. The coils 108 and 116 of the inlet valve balancing relay 112 control the balancing and positioning of a balance contact arm 120 which, through contacts 122 and 124, in turn controls the making or breaking of electrical circuits through the reversible servomotor 84 of the first or inlet valve timing regulating slide 72. The coils 110 and 118 of the exhaust valve balancing relay 114 similarly control the balancing and movement of a balance contact arm 126 for in turn controlling the making and breaking of electrical circuits through contacts 128 and 130 electrically connected to the reversible servomotor 94 for the second or exhaust valve timing regulating slide 76.

Thus, in this second embodiment incorporating the principles of the present invention and shown in FIG. 4, the exact speed of the internal combustion engine is monitored or sensed and an electrical signal produced varying exactly according to said engine speed, while the exact timings of the separate sets of inlet and exhaust valves are simultaneously monitored or sensed and electrical signals produced varying exactly according to variations in said timings, As long as the engine speed electrical signals balance with the separate electrical signals for inlet valve timing and exhaust valve timing, said timing is maintained constant, but upon a change in said engine speed being sensed, the inlet and exhaust valve timings are automatically electrically changed according to preplanned programmed settings appropriate for said engine speed change. With the separate inlet and exhaust valve timing controls, it is evident that the timing of the inlet valves may be programmed different from the timing of the exhaust valves in order to provide the most efficient combustions within the cylinders of the engine and dependent on the particular engine design.

In both of the embodiments of the present invention hereinbefore described, the electrical signals or engine speed and valve timing are described as balancing to provid the exact valve timing for the particular increment of engine speed, but it is evident that the comparison of electrical signals is the only thing important for providing the results of the present invention. In other words, such comparative electrical signals would not necessarily be required to balance from the standpoint of being equal, but rather could balance merely on a determinable proportionate basis, with the construction of the balance relay coils being adjusted accordingly. The important thing is that the exact same results would be produced and such alterations are fully contemplated within the scope of the present invention.

Also, many other apparent variations in construction could be incorporated to produce the same results. For instance, the engine speed could be monitored in many other apparent fashions, such as by electronic means monitoring the engine speed from any component driven thereby, all of which are necessarily associated in some way with the crankshaft and by some manner give an indication of crankshaft speed of rotation. Furthermore, the valve timing changes could be accomplished by many other mechanical arrangements, such as by electrically actuated or controlled fluid cylinders or otherwise, all within the skill of the art. The important thing is that engine speed and valve timing electrical signals are produced capable of comparison, said electrical signals are compared, and the valve timing varied at preplanned rates and preplanned settings according to a predetermined schedule or program for each increment of engine speed, said schedule or program being dependent on the particular engine design and whether an individual schedule for all of the engine valves or separate schedules for the engine inlet and exhaust valves.

According to the present invention, therefore, variable valve timing for internal combustion engines is provided wherein preplanned valve timing according to a preset schedule or schedules for each increment of engine speed is automatically maintained accomplishing maximum engine combustion efficiency for the particular engine design. Furthermore, said valve timing schedule versus engine speed may be altered simply and accurately for each individual engine or for each individual engine design, again assuring the maximum of combustion efficiency. As a result, it is easily possible to greatly reduce the undesirable products of combustion from modern day internal combustion engines so as to provide a practical solution to a major, present day problem involving smog producing waste emissions in populous areas.

I claim:
1. In an internal combustion engine of the type having a rotatable crankshaft driven by pistons reciprocal in cylinders, said cylinders having valves controlling an inlet of fuel mixture into said cylinders for combustion therein to reciprocally drive said pistons and the exhaust from said cylinders of products of said combustion, and valve operating means for opening and closing said valves in a timed sequence relative to said piston movements and said cylinder combustions to provide said fuel mixture inlet and said combustion products exhaust; the improvements of a variable valve timing control comprising the combination of: engine speed monitoring means operably associated with said crankshaft for constantly sensing the speed of rotation of said crankshaft and producing an electrical signal varying at preplanned rates exactly according to variations in crankshaft speed; timing monitoring means operably associated with said valve operating means for constantly sensing the timing of the opening and closing of said valves relative to said piston movements and producing an electrical signal varying at preplanned rates exactly according to variations in valve timing, said electrical signals of said timing monitoring means balancing in at least a determinable proportionate manner with said electrical signals of said engine speed monitoring means when said valve timed sequence is in a preplanned timed relationship to said piston movements for each increment of variation in crankshaft speed; timing regulating means operably connected to said valve operating means and electrically actionable for varying said valve operating means to vary said valve timing; and electrical signal balancing means operably connected to said timing regulating means and electrically connected to said engine speed and timing monitoring means for sensing an out-of-balance condition between said electrical signals of said engine speed and timing monitoring means and actuating said timing regulating means to vary said timing and balance of electrical signals.

2. The variable valve timing control as defined in claim 1 in which said engine speed monitoring means includes speed sensing means operably connected for receiving an indication corresponding to said crankshaft speed of rotation and producing an electrical signal varying at preplanned rates exactly according to said crankshaft speed of rotation.

3. The variable valve timing control as defined in claim 1 in which said engine speed monitoring means includes engine speed indicating means operably connected for constantly sensing the speed of rotation of said crankshaft, tachometer, transmitter means operably connected to said engine speed indicating means for producing an electrical signal varying at preplanned rates exactly according ot variations in crankshaft speed.

4. The variable valve timing control as defined in claim 1 in which said valve operating means is rotatable for opening and closing said valves; and in which said timing regulating means is operably connected to said camshaft means electrically actionable for varying drive to said camshaft means to vary said valve timing.

5. The variable valve timing control as defined in claim 1 in which said cylinders of said internal combustion engine have inlet and exhaust valves; in which said valve operating means of said internal combustion engine includes a rotatable camshaft for opening and closing said inlet valves, a rotatable camshaft for opening and closing said exhaust valves; in which said timing monitoring means includes in'et timing monitoring means for constantly sensing the timing of the opening and closing of said inlet valves relative to said piston movements and producing an electrical signal varying at preplanned rates exactly according to variations in inlet valve timing, exhaust timing monitoring means for constantly sensing the timing of the opening and closing of said exhaust valves relative to said piston movements and producing an electrical signal varying at preplanned rates exactly according to variations in exhaust valve timing, said electrical signals of said inlet and exhaust timing monitoring means balancing in at least determinable proportionate manners with said electrical signals of said engine speed monitoring means when said inlet and exhaust valve timed sequences are in a preplanned timed relationship to said piston movements for each increment of variation in crankshaft speed; in which said timing regulating means includes inlet timing regulating means operably connected to said inlet valve camshaft and electrically actionable for varying drive to said inlet valve camshaft to vary said inlet valve timing, exhaust timing regulating means operably connected to said exhaust valve camshaft and electrically actionable for varying drive to said exhaust valve camshaft to vary said exhaust valve timing; and in which said electrical signal balancing means is operably connected to each of said inlet and exhaust timing regulating means and electrically connected to said engine speed monitoring means and each of said inlet and exhaust timing monitoring means for sensing out-of-balance conditions between said electrical signals of said engine speed monitoring means and each of said inlet and exhaust timing monitoring means and actuating the appropriate of said inlet and exhaust timing regulating means to vary said timing and balance said electrical signals.

6. The variable valve timing control as defined in claim 1 in which said cylinders of said internal combustion engine have inlet and exhaust valves; in which said valve operating means of said internal combustion engine is operable for opening and closing said inlet valves separate from opening and closing said exhaust valves; in which said timing monitoring means includes inlet timing monitoring means for constantly sensing the timing of the opening and closing of said inlet valves relative to said piston movements and producing an electrical signal varying at preplanned rates exactly according to variations in inlet valve timing, exhaust timing monitoring means for constantly sensing the timing of the opening and closing of said exhaust valves rela'ive to said piston movements and producing an electrical signal varying at preplanned rates exactly according to variations in exhaust valve timing, said electrical signals of said inlet and exhaust timing monitoring means balancing in at least determinable proportionate manners with said electrical signals of said engine speed monitoring means when said inlet and exhaust valve timed sequences are in a preplanned timed relationship to said piston movements for each increment of variation in crankshaft speed; in which said timing regulating means includes inlet timing regulating means operably connected to said valve operating means and electrically actionable for varying said valve operating means to vary said inlet valve timing, exhaust timing regulating means operably connected to said valve operating means and electrically actionable for varying said valve operating means to vary said exhaust valve timing; and in which said electrical signal balancing means is operably connected to each of said inlet and exhaust timing regulating means and electrically connected to said engine speed monitoring means and each of said inlet and exhaust timing monitoring means for sensing out-of-balance conditions between said electrical signals of said engine speed monitoring means and each of said inlet and exhaust timing monitoring means and actuating the appropriate of said inlet and exhaust timing regulating means to vary said timing and balance said electrical signals.

7. The variable valve timing control as defined in claim 1 in which said electrical signal balancing means includes at least one balancing relay electrically connected to said engine speed and timing monitoring means actionable upon receiving an out-of-balance condition between said electrical signals of said engine speed and timing monitoring means and automatically electrically actuating said timing regulating means to vary said timing and balance said electrical signals.

8. The variable valve timing control as defined in claim 1 in which said timing regulating means includes at least one electrically actuated servomotor operably connected to said valve operating means and electrically actionable for varying said valve operating means to vary said valve timing; and in which said electrical signal balancing means is electrically connected to said servomotor of said timing regulating means to vary said timing by actuating said servomotor and balance said electrical signals.

9. The variable valve timing control as defined in claim 1 in which said cylinders of said internal combustion engine have inlet and exhaust valves; in which said valve operating means of said internal combustion engine is actionable for opening and closing said inlet valves and for opening and closing said exhaust valves; in which said timing monitoring means includes inlet timing monitoring means for constantly sensing the timing of the opening and closing of said inlet valves relative to said piston movements and producing an electrical signal varying at preplanned rates exactly according to variations in inlet valve timing, exhaust timing monitoring means for constantly sensing the timing of the opening and closing of said exhaust valves relative to said piston movements and producing an electrical signal varying at preplanned rates exactly according to variations in exhaust valve timing, said electrical signals of said inlet and exhaust timing monitoring means balancing in at least determinable proportionate manners with said electrical signals of said engine speed monitoring means when said inlet and exhaust valve timed sequences are in a preplanned timed relationship to said piston movements for each increment of variation in crankshaft speed; in which said timing regulating means includes inlet timing regulating means operably connected to said valve operating means and electrically actionable for varying said valve operating means to vary said inlet valve timing, exhaust timing regulating means operably connected to said valve operating means and electrically actionable for varying said valve operating means to vary said exhaust valve timing; and in which said electrical signal balancing means includes a balancing relay electrically connected to said inlet timing regulating means and electrically connected to said engine speed and inlet timing monitoring means, a balancing relay electrically connected to said exhaust timing regulating means and electrically connected to said engine speed and exhaust timing monitoring means, said balancing relays being actionable for sensing out-of-balance conditions between said electrical signals of said engine speed monitoring means and each of said inlet and exhaust timing monitoring means and automatically electrically actuating the appropriate of said inlet and exhaust timing regulating means to vary said timing and balance said electrical signals.

10. The variable valve timing control as defined in claim 1 in which said cylinders of said internal combustion engine have inlet and exhaust valves; in which said valve operating means of said internal combustion engine is operably connected for opening and closing said inlet valves and for opening and closing said exhaust valves; in which said timing monitoring means includes inlet timing monitoring means for constantly sensing the timing of the opening and closing of said inlet valves relative to said piston movements and producing an electrical signal varying at preplanned rates exactly according to variations in inlet valve timing, exhaust timing monitoring means for constantly sensing the timing of the opening and closing of said exhaust valves relative to said piston movements and producing an electrical signal varying at preplanned rates exactly according to variations in exhaust valve timing, said electrical signals of said inlet and exhaust timing monitoring means balancing in at least determinable proportionate manners with said electrical signals of said engine speed monitoring means when said inlet and exhaust valve timed sequences are in a preplanned timed relationship to said piston movements for each increment of variation in crankshaft speed; in which said timing regulating means includes an electrically actuated servomotor operably connected to said valve operating means and electrically actionable for varying said valve operating means to vary said inlet valve timing, an electrically actuated servomotor operably connected to said valve operating means and electrically actionable for varying said valve operating means to vary said exhaust valve timing; and in which said electrical signal balancing means is electrically connected to each of said inlet and exhaust timing regulating servomotors and electrically connected to said engine speed monitoring means and each of said inlet and exhaust timing monitoring means for sensing out-of-balance conditions between said electrical signals of said engine speed monitoring means and each of said inlet and exhaust timing monitoring means and electrically actuating the appropriate of said inlet and exhaust timing regulating servomotors to vary said timing and balance said electrical signals.

11. The variable valve timing control as defined in claim 1 in which said timing monitoring means includes at least one potentiometer operably connected to said valve operating means producing an electrical signal varying at preplanned rates exactly according to variations in said valve timing.

12. The variable valve timing control as defined in claim 1 in which said cylinders of said internal combustion engine have inlet and exhaust valves; in which said valve operating means of said internal combustion engine is operably connected for opening and closing said inlet valves and for opening and closing said exhaust valves; in which said timing monitoring means includes a potentiometer operably connected to said valve operating means producing an electrical signal varying at preplanned rates exactly according to variations in said inlet valve timing, a potentiometer operably connected to said valve operating means producing an electrical signal varying at preplanned rates exactly according to variations in said exhaust valve timing, said electrical signals of said inlet timing monitoring potentiometer and said exhaust timing monitoring potentiometer balancing in at least determinable proportionate manners with said electrical signals of said engine speed monitoring means when said inlet and exhaust valve timed sequences are in a preplanned timed relationship to said piston movements for each increment of variation in crankshaft speed; in which said timing regulating means includes inlet timing regulating means operably connected to said valve operating means and electrically actionable for varying said valve operating means to vary said inlet valve timing, exhaust timing regulating means operably connected to said valve operating means for varying said valve operating means to vary said exhaust valve timing; and in which said electrical signal balancing means is operably connected to each of said inlet and exhaust timing regulating means and electrically connected to said engine speed monitoring means and each of said inlet and exhaust timing monitoring potentiometers for sensing out-of-balance conditions between said electrical signals of said engine speed monitoring means and each of said inlet and exhaust timing monitoring potentiometers and actuating the appropriate of said inlet and exhaust timing regulating means to vary said timing and balance said electrical signals.

13. The variable valve timing control as defined in claim 1 in which said valve operating means of said internal combustion engine includes camshaft means rotatable for opening and closing said valves; in which said timing regulating means is operably connected to said camshaft means electrically actionable for varying drive to said camshaft means to vary said valve timing; and in which said electrical signal balancing means includes at least one balancing relay electrically connected to said engine speed and timing monitoring means actionable upon receiving an out-of-balance condition between said electrical signals of said engine speed and timing monitoring means and automatically electrically actuating said timing regulating means to vary said timing by varying drive to said camshaft means and balance said electrical signals.

14. The variable valve timing control as defined in claim 1 in which said cylinders of said internal combustion engine have inlet and exhaust valves; in which said valve operating means of said internal combustion engine includes a rotatable camshaft for opening and closing said inlet valves, a rotatable camshaft for opening and closing said exhaust valves; in which said timing monitoring means includes inlet timing monitoring means for constantly sensing the timing of the opening and closing of said inlet valves relative to said piston movements and producing an electrical signal varying at preplanned rates exactly according to variations in inlet valve timing, exhaust timing monitoring means for constantly sensing the timing of the opening and closing of said exhaust valves relative to said piston movements and producing an electrical signal varying at preplanned rates exactly according to variations in exhaust valve timing, said electrical signals of said inlet and exhaust timing monitoring means balancing in at least determinable proportionate manners with said electrical signals of said engine speed monitoring means when said inlet and exhaust valve timed sequences are in a preplanned timed relationship to said piston movements for each increment of variation in crankshaft speed; in which said timing regulating means includes inlet timing regulating means operably connected to said inlet valve camshaft and electrically actionable for varying drive to said inlet valve camshaft to vary said inlet valve timing, exhaust timing regulating means operably connected to said exhaust valve camshaft and electrically actionable for varying drive to said exhaust valve camshaft to vary said exhaust valve timing; and in which said electrical signal balancing means includes a balancing relay electrically connected to said inlet timing regulating means and electrically connected to said engine speed and inlet timing monitoring means, a balancing relay electrically connected to said exhaust timing regulating means and electrically connected to said engine speed and exhaust timing monitoring means, said balancing relays being actionable for sensing out-of-balance conditions between said electrical signals of said engine speed monitoring means and each of said inlet and exhaust timing monitoring means and automatically electrically actuating the appropriate of said inlet and exhaust timing regulating means to vary said timing and balance said electrical signals.

15. The variable valve timing control as defined in claim 1 in which said valve operating means of said internal combustion engine includes camshaft means rotatable for opening and closing said valves; in which said timing monitoring means includes at least one potentiometer operably connected to said valve operating means producing an electrical signal varying at preplanned rates exactly according to variations in said valve timing; in which said timing regulating means includes at least one electrically actuator servomotor operably connected to said valve operating means and electrically actionable for varying drive to said camshaft means of said valve operating means to vary said valve timing; and in which said electrical signal balancing means includes at least one balancing relay electrically connected to said engine speed monitoring means and said potentiometer of said timing monitoring means actionable upon receiving an out-of-balance condition between said electrical signals of said engine speed monitoring means and potentiometer of said timing monitoring means and automatically electrically actuating said servomotor of said timing regulating means to vary said drive to said valve operating means camshaft for varying said valve timing and balancing said electrical signals.

16. The variable valve timing control as defined in claim 1 in which said cylinders of said internal combustion engine have inlet and exhaust valves; in which said valve operating means of said internal combustion engine includes a rotatable camshaft for opening and closing said inlet valves, a rotatable camshaft for opening and closing said exhaust valves; in which said timing monitoring means includes a potentiometer operably connected to said valve operating means producing an electrical signal varying at preplanned rates exactly according to variations in said inlet valve timing, a potentiometer operably connected to said valve operating means producing an electrical signal varying at preplanned rates exactly according to variations in said exhaust valve timing, said electrical signals of said inlet timing monitoring potentiometer and said exhaust timing monitoring potentiometer balancing in at least determinable proportionate manners with said signals of said engine speed monitoring means when said inlet and exhaust valve timed sequences are in a preplanned timed relationship to said piston movements for each increment of variation in crankshaft speed; in which said timing regulating means includes an electrically actuated servomotor operably connected to said inlet valve camshaft and electrically actionable for varying drive to said inlet valve camshaft to vary said inlet valve timing, an electrically actuated servomotor operably connected to said exhaust valve camshaft and electrically actionable for varying drive to said exhaust valve camshaft to vary said exhaust valve timing; and in which said electrical signal balancing means includes a balancing relay electrically connected to said inlet timing regulating servomotor and electrically connected to said engine speed monitoring means and said inlet timing monitoring potentiometer, a balancing relay electrically connected to said exhaust timing regulating servomotor and electrically connected to said engine speed monitoring means and said exhaust timing monitoring potentiometer, said balancing relays being actionable for sensing out-of-balance conditions between said electrical signals of said engine speed monitoring means and each of said inlet and exhaust timing monitoring potentiometers and automatically electrically actuating the appropriate of said inlet and exhaust timing regulating servomotors to vary said timing and balance said electrical signals.

17. In a method of varying valve timing to an exact preplanned time sequence relative to piston reciprocal movements for each increment of engine speed of an internal combustion engine; the steps of sensing engine speed and producing an electrical signal varying at preplanned rates exactly according to variations in said engine speed; providing valve timing variable in relation to piston reciprocal movements over a preplanned range; sensing said valve timing and producing an electrical signal varying at preplanned rates exactly according to said valve timing variations; and constantly comparing said engine speed and valve timing electrical signals and adjusting said valve timing to a preplanned setting for each increment of variation of engine speed.

18. The method of varying valve timing as defined in claim 17 in which said step of providing said valve timing variable in relation to piston reciprocal movements includes the providing of both inlet valve timing and exhaust valve timing of said engine variable in relation to piston reciprocal movements over preplanned ranges; in which said step of sensing said valve timing includes the sensing of said valve timing of both said inlet and exhaust valves and producing separate inlet timing electrical signals and exhaust timing electrical signals varying at preplanned rates exactly according to said inlet and exhaust valve timing variations; and in which said step of constantly comparing said engine speed and valve timing electrical signals includes the constant comparing of said engine speed electrical signals and each of said electrical signals of said inlet and exhaust valve timing and adjusting each of said inlet and exhaust valve timing to preplanned settings for each increment of variation of engine speed.

19. The method of varying valve timing as defined in claim 17 in which said step of constantly comparing said engine speed and valve timing electrical signals includes the automatically electrically adjusting said valve timing to a preplanned setting for each increment of variation of engine speed.

20. The method of varying valve timing as defined in claim 17 in which said step of providing said valve timing variable in relation to piston reciprocal movements includes the providing of both inlet valve timing and exhaust valve timing of said engine variable in relation to piston reciprocable movements over preplanned ranges; in which said step of sensing said valve timing includes the sensing of said valve timing of both said inlet and exhaust valves and producing separate inlet timing electrical signals and exhaust timing electrical signals varying at preplanned rates exactly according to said inlet and exhaust valve timing variations; and in which said step of constantly comparing said engine speed and valve timing electrical signals includes the constant comparing of said engine speed electrical signals and each of said electrical signals of said inlet and exhaust valve timing and automatically electrically adjusting each of said inlet and exhaust valve timing to preplanned settings for each increment of variation of engine speed.

21. The method of varying valve timing as defined in claim 17 in which said step of providing said valve timing variable in relation to piston reciprocal movements includes the providing of both inlet valve timing and exhaust valve timing of said engine variable in relation to piston reciprocal movements over preplanned ranges; in which said step of sensing said valve timing includes the sensing of said valve timing of both said inlet and exhaust valves and producing separate inlet timing electrical signals and exhaust timing electrical signals varying at preplanned rates exactly according to said inlet and exhaust valve timing variations; and in which said step of constantly comparing said engine speed and valve timing electrical signals includes the constant comparing of said engine speed electrical signals and each of said electrical signals of said inlet and exhaust valve timing and adjusting one of said inlet and exhaust valve timing to a preplanned setting for each increment of variation of engine speed, and simultaneously with each adjustment of said one of said inlet and exhaust valve timing to said preplanned setting, one of retaining constant and adjusting to a preplaned setting the other of said inlet and exhaust valve timing for each increment of variation of engine speed.

22. In a method of varying valve timing to an exact preplanned timed sequence relative to piston reciprocal movements for each increment of engine speed of an internal combustion engine; the steps of: monitoring engine speed and producing an electrical signal varying in a preplanned manner according to variations in said engine speed; providing valve timing variable in relation to piston reciprocal movements over a preplanned range; monitoring valve timing and producing an electrical signal varying in a preplanned manner according to variations in said valve timing and balancing at least in a determinable manner with said engine speed signal when said valve timing is at a preplanned setting for each increment of engine speed setting; and constantly monitoring said engine speed and valve timing signals for an out-of-balance condition between said signals and varying said valve timing to rebalance said signals, thereby placing said valve timing at said preplanned setting for each increment of said engine speed setting.

23. The method of varying valve timing as defined in claim 22 in which said step of providing said valve timing variable in relation to piston reciprocal movements includes the providing of both inlet valve timing and exhaust valve timing of said engine variable in relation to piston reciprocal movements over preplanned ranges; in which said step of monitoring said valve timing includes the monitoring of said valve timing of both said inlet and exhaust valves and producing separate inlet timing electrical signals and exhaust timing electrical signals varying in preplanned manners according to variations in said inlet and exhaust valve timing; and in which said step of constantly monitoring said engine speed and valve timing signals for an out-of-balance condition between said signals includes the constant monitoring of said engine speed electrical signals and each of said electrical signals of said inlet and exhaust valve timing and varying each of said inlet and exhaust valve timing to rebalance said signals.

24. The method of varying valve timing as defined in claim 22 in which said step of constantly monitoring said engine speed and valve timing signals includes the constantly electrically monitoring said engine speed and valve timing signals for an out-of-balance condition between said signals and automatically electrically varying said valve timing to rebalance said signals.

25. The method of varying valve timing as defined in claim 22 in which said step of providing said valve timing variable in relation to piston reciprocal movements includes the providing of both inlet valve timing and exhaust valve timing of said engine variable in relation to piston reciprocal movement over preplanned ranges; in which said step of monitoring said valve timing includes the monitoring of said valve timing of both said inlet and exhaust valves and producing separate inlet timing electrical signals and exhaust timing electrical signals varying in preplanned manners according to variations in said inlet and exhaust valve timing; and in which said step of constantly monitoring said engine speed and valve timing signals for an out-of-balance condition between said signals includes the constantly electrically monitoring said engine speed electrical signals and each of said electrical signals of said inlet and exhaust valve timing and automatically electrically varying each of said inlet and exhaust valve timing to rebalance said signals.

References Cited

UNITED STATES PATENTS

| | | |
|---|---|---|
| 1,819,743 | 8/1931 | Duncan. |
| 2,305,787 | 12/1942 | Kales. |
| 2,827,884 | 3/1958 | Stivender. |

BENJAMIN W. WYCHE III, Primary Examiner

U.S. Cl.X.R.

74—242.11